Dec. 28, 1948.  A. J. ROSENBERGER  2,457,320
FLUID SEAL
Filed March 22, 1945
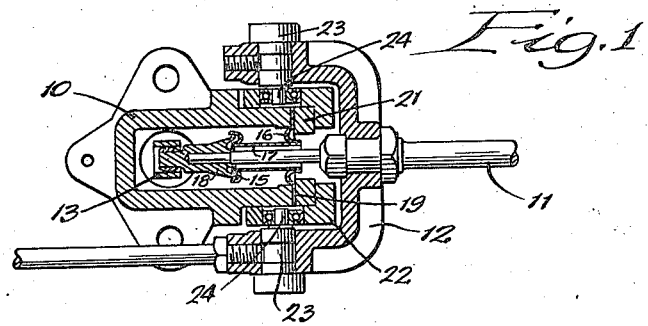
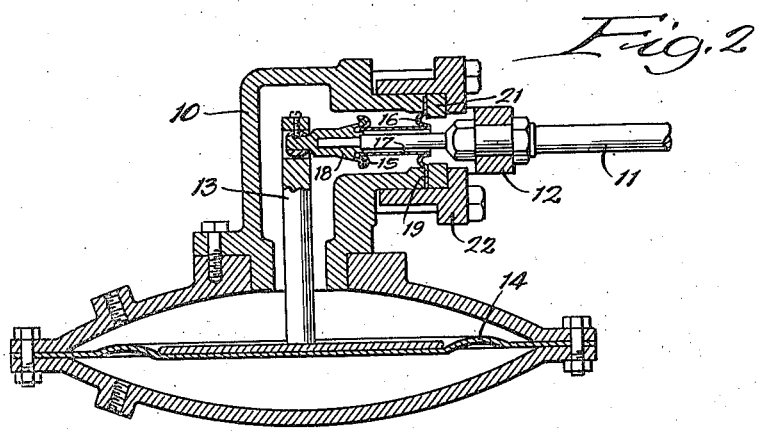
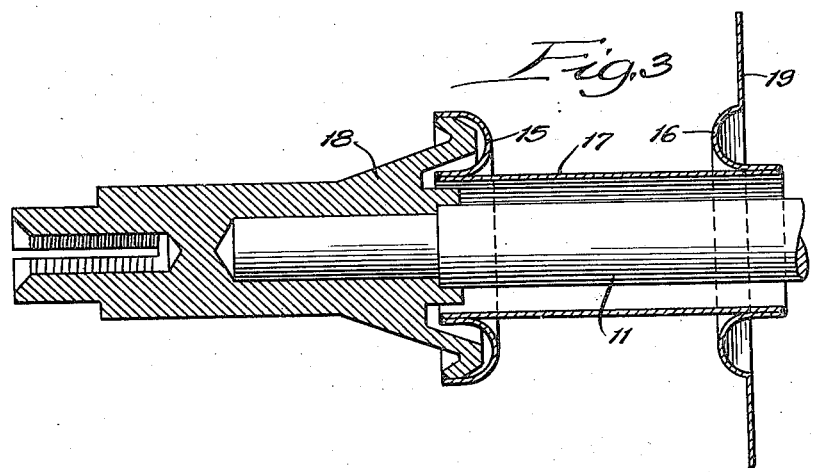
Inventor:
Albert J. Rosenberger,
By Dawson, Ooms and Booth
Attorneys.

Patented Dec. 28, 1948

2,457,320

UNITED STATES PATENT OFFICE 2,457,320

FLUID SEAL

Albert J. Rosenberger, Chicago, Ill., assignor to Republic Flow Meters Company, Chicago, Ill., a corporation of Illinois Application March 22, 1945, Serial No. 584,074

2 Claims. (Cl. 286—29)

1

This invention relates to fluid seals and more particularly to a fluid seal for use with a pressure responsive instrument.

In pressure responsive instruments of many types, it is frequently necessary to transmit a force or movement from an enclosed housing to a point outside of the housing through a pivoted lever or the like. One type of mechanism for sealing the space between the housing and the lever against leakage without interfering with proper balance of the lever is disclosed and claimed in my Patent No. 2,299,179. This construction is highly satisfactory for the purpose.

In some types of instruments for use with corrosive fluids, it is necessary to form the instrument parts which come into contact with the fluids of materials which are substantially unaffected by the fluids. Many materials of this type do not lend themselves to the formation of bellows, as shown in my prior patent. For example, in measuring flow or pressure of chlorine, it is desired to use either tantalum or platinum and neither of these materials has sufficient ductility to be formed readily into bellows.

It is one of the objects of the present invention to provide a fluid seal which can be made of materials having low ductility.

Another object is to provide a fluid seal in which a relatively small deformation of the material from which the seal is made is required.

The above and other objects and advantages of the invention will be more readily apparent from the following description when read in connection with the accompanying drawing, in which—

Figure 1 is a sectional type view of a fluid seal embodying the invention and adjacent instrument parts;

Figure 2 is a vertical section through the seal structure; and

Figure 3 is an enlarged partial view similar to Figure 2 showing the seal construction.

The seal is adapted to be used with an instrument including a hollow housing 10 having an opening at one end into which a lever 11 projects. The lever carries a yoke 12 whose legs straddle the housing and are pivoted thereto pivotally to mount the lever on the housing. The end of the lever which projects into the housing is connected through a post 13 to a flexible diaphragm 14 adapted to be exposed on its opposite surfaces to different pressures to exert a tilting force on the lever.

The space between the lever and the housing is adapted to be closed by a flexible seal construc-

2 tion including a pair of annular diaphragms 15 and 16 mounted around the lever. The inner edges of the diaphragms may be connected by welding or the like to a tube 17 fitting loosely around the lever. The diaphragms 15 and 16 and the tube 17 can readily be formed of relatively brittle materials such as tantalum or platinum which would not be suitable for the formation of bellows.

The outer edge of the diaphragm 15 is secured to an enlarged portion 18 on the lever 11 and the outer edge of the diaphragm 16 extends outwardly in a plane as indicated at 19 to provide a clamping portion. As shown in Figures 1 and 2, the diaphragm portion 19 may be clamped between the end of the housing 10 and a clamping ring 21 secured thereon by a collar 22.

In order to remove any tilting force which might be exerted on the lever by the diaphragms in the event the lever is not exactly centered with its pivotal mounting, the pivotal connection between the yoke 12 and the housing 10 is made adjustable. As shown, the legs of the yoke 12 carry rotatable plugs 23 which have eccentric pins 24 on their inner ends which are mounted in bearings carried by the housing. By turning the plugs 23, the effective pivotal axis may be shifted laterally of the lever 11 so that it may be properly centered with the lever axis. Under these conditions any force exerted on the lever by the diaphragms will be parallel to the lever axis and will not tend to tilt the lever.

Adjustment of the pivotal axis causes a slight movement of the tube 17 relative to the lever. This movement is easily accommodated by a slight flexing of the diaphragms 15 and 16 so that the seal is not interfered with. As the lever pivots during operation, the diaphragms will flex causing the tube 17 to move slightly toward or away from the lever, sufficient clearance being provided so that the tube and lever will not engage each other. It will be understood that the pivotal movements required in an instrument of this character are relatively slight so that they can easily be accommodated by flexing of the diaphragms.

With this construction, a fluid tight seal against corrosive fluids can be provided having all of the advantages of the seal of my Patent No. 2,299,179. The seal of the present invention can readily be made of materials having a low ductility with a minimum working of the materials.

While one embodiment of the invention has been shown and described in detail, it will be understood that this is illustrative only and is not intended as a definition of the scope of the invention, reference being had for this purpose to the appended claims.

What is claimed is:

1. A fluid seal for a pressure responsive instrument comprising a hollow housing adapted to be exposed on its inside to a pressure different than that on its outside, a lever pivoted adjacent the housing one end of which extends into the housing, a pair of spaced annular diaphragms around the lever, each diaphragm being formed by a single annular sheet of curved cross section means connecting the outer edge of one of the diaphragms to the lever, means to connect the outer edge of the other diaphragm to the housing, and a tube around the lever connected at its ends to the inner edges of the diaphragms.

2. A fluid seal for a pressure responsive instrument comprising a hollow housing adapted to be exposed on its inside to a pressure different than that on its outside, a lever having one end extending into the housing, a yoke carried by the lever straddling the housing, adjustable pivot means connecting the yoke to the housing pivotally to support the lever and adjustable to shift the pivoted axis transversely of the lever, a pair of spaced annular diaphragms around the lever one of which is connected to the lever and the other to the housing, each diaphragm being formed by a single annular sheet of curved cross section and a tube around the lever connected at its ends to the diaphragms respectively.

ALBERT J. ROSENBERGER.

REFERENCES CITED

The following references are of record in the file of this patent:

UNITED STATES PATENTS

| Number | Name | Date |
|---|---|---|
| 1,787,700 | Persons | Jan. 6, 1931 |
| 2,299,179 | Rosenberger | Oct. 20, 1942 |
| 2,352,038 | Tolke | June 20, 1944 |